United States Patent
Huo et al.

(10) Patent No.: US 12,467,495 B1
(45) Date of Patent: Nov. 11, 2025

(54) FLOW DRILL SCREW

(71) Applicant: Kunhou Auto Parts (Guangdong) Co., Ltd., Yangjiang (CN)

(72) Inventors: Yongjiu Huo, Yangjiang (CN); Huaiwen Liu, Yangjiang (CN); Chuanbing Zhong, Yangjiang (CN)

(73) Assignee: Kunhou Auto Parts (Guangdong) Co., Ltd., Yangjiang (CN)

( * ) Notice: Subject to any disclaimer, the term of this patent is extended or adjusted under 35 U.S.C. 154(b) by 0 days.

(21) Appl. No.: 19/254,160

(22) Filed: Jun. 30, 2025

(30) Foreign Application Priority Data

Sep. 4, 2024 (CN) .......................... 202411232961.5

(51) Int. Cl.
*F16B 25/10* (2006.01)
*B21J 5/06* (2006.01)
*F16B 25/00* (2006.01)

(52) U.S. Cl.
CPC .............. *F16B 25/106* (2013.01); *B21J 5/066* (2013.01); *F16B 25/0021* (2013.01)

(58) Field of Classification Search
CPC ...... B21J 5/066; F16B 25/106; F16B 25/0021
See application file for complete search history.

(56) References Cited

U.S. PATENT DOCUMENTS

2021/0262511 A1   8/2021   Grojean
2024/0271653 A1   8/2024   Dornik

FOREIGN PATENT DOCUMENTS

| | | |
|---|---|---|
| CN | 101169149 A | 4/2008 |
| CN | 103071969 A | 5/2013 |
| CN | 118517465 A | 8/2024 |
| CN | 104564972 A | 4/2025 |
| DE | 102014211093 A1 | 12/2015 |
| GB | 1461995 A | 1/1977 |
| JP | 2008137067 U | 6/2008 |
| KR | 20210078992 A | 6/2021 |
| TW | M407970 U | 7/2011 |

*Primary Examiner* — Moshe Wilensky
(74) *Attorney, Agent, or Firm* — JEEN IP LAW, LLC

(57) ABSTRACT

A flow drill screw is provided, which includes a head, a threaded section of a rod, and a tip portion; the head is configured to connect with an external tool; the threaded section of the rod is configured for self-tapping a plate; the tip portion is configured to penetrate the plate; the threaded section of the rod and the tip portion are made of different metal materials, and ends of the threaded section of the rod and the tip portion are connected and fixed by welding. By using two different materials to make the threaded section of the rod and the tip portion, it can cope with different plates and meet different usage scenarios, and save costs. This design enables the screw to perform well under various complex conditions, thereby improving its applicability and reliability, and has significant economic and social benefits.

5 Claims, 4 Drawing Sheets

FLOW DRILL SCREW

CROSS-REFERENCE TO RELATED APPLICATIONS

This application claims priority to Chinese Patent Application No. 202411232961.5, filed on Sep. 4, 2024, which is hereby incorporated by reference in its entirety.

TECHNICAL FIELD

The present disclosure relates to the field of flow drill screws technologies, and in particular, to a flow drill screw.

BACKGROUND

Flow drill screws can be used to connect dissimilar materials on one side, and through holes formed on site after connecting multiple components can maintain sealing; the hot melt self-tapping process eliminates the need for pre-opening holes, pre-threading nuts or threads on components, simplifies the manufacturing process, and reduces costs. Based on the above advantages, flow drilling screws and hot melt self-tapping technology are widely used in products such as steel aluminum hybrid car bodies and battery pack trays.

The flow drill screw is transmitted to the connected plate through high-speed rotation, it is caused to generate frictional heat and plastic deformation, and then self-tapping and screwing. As shown in FIG. 1, at the beginning of the tightening process, the flow drill screw is placed on a surface of the plate (usually an aluminum plate or thin steel plate), and the installation tool outputs high speed to the flow drill screw and applies pressure (1), the tip portion of the high-speed rotating screw is caused to exert downward pressure on the surface of the workpiece, and generates extremely high frictional heat to melt the plate (2). Then, the top of the screw penetrates the material to form a perforation, and continues to rotate to enlarge the perforation (3). When the threaded section of the screw abuts against the plate, the screw begins to contact the thread. After the thread is formed, the screw is tightened according to a preset torque until the fastening connection is completed (6).

In practical applications, for installation plates made of different materials, such as high-strength plates, aluminum plates, etc., metal materials with stronger wear resistance are needed to penetrate the plates. However, it is difficult to form threads for metal materials with strong wear resistance, and the cost is high. Moreover, existing screws cannot be customized, which cannot meet most usage scenarios.

SUMMARY

The purpose of the present disclosure is to provide a flow drill screw to solve the problems raised in the background technology mentioned above.

To achieve the above objectives, the present disclosure provides the following technical solution.

A flow drill screw, including a head, a threaded section of a rod, and a tip portion;
  the head is configured to connect with an external tool;
  the threaded section of the rod is configured for self-tapping a plate;
  the tip portion is configured to penetrate the plate;
  the threaded section of the rod and the tip portion are made of different metal materials, and ends of the threaded section of the rod and the tip portion are connected and fixed by welding.

The beneficial effects of the present disclosure are as follows.

The present disclosure uses two different materials to make the threaded section and tip portion of the rod, which can adapt to different plates and meet different usage scenarios, and saving costs. This design enables the screw to perform well under various complex conditions, thereby improving its applicability and reliability, and has significant economic and social benefits.

In some embodiments of the present application, an end of the tip portion and an end of the threaded section of the rod are both provided with concave convex structures that are cooperated with each other.

In some embodiments of the present application, the end of the tip portion and the end of the threaded section of the rod are both flat.

In some embodiments of the present application, the tip portion is made of tungsten steel alloy material.

In some embodiments of the present application, the threaded section of the rod is made of corrosion-resistant steel material.

In some embodiments of the present application, a lower end of the tip portion is provided with a plurality of concave points on an outer periphery.

In some embodiments of the present application, a through hole is provided at a central axis position of the threaded section of the rod; one end of the through hole is extended to an end face of the tip portion close to the head, and the other end of the through hole is extended to the head to communicate with an outside world.

A use method of fixing an ultra-high strength steel plate, including the above-mentioned flow drill screw, and the use method includes:
  a tool is used to clamp the head of the screw, the other end of the screw abuts against the ultra-high strength steel plate and kept perpendicular to the ultra-high strength steel plate; at the same time, the tool is provided with a top pressing rod passing through the through hole, and an end of the top pressing rod abuts against an end face of the tip portion;
  pressure is applied to the screw with the tool; end faces of the head and the tip portion of the screw that are connected with the ultra-high strength steel plate are simultaneously subjected to pressure, and the pressure is concentrated at a contact point between the tip portion and the ultra-high strength steel plate, thereby forming a recess fixing point on the ultra-high strength steel plate;
  the tool is used to rotate the screw at high speed and continuously apply pressure to the ultra-high strength steel plate, thereby creating a huge frictional force between the ultra-high strength steel plate and the tip portion; the tip portion is made of tungsten steel alloy material, and the tip portion withstands temperatures up to 900-1000° C.; during this process, the ultra-high strength steel plate is in a hot red and soft state, so that the tip portion penetrates the ultra-high strength steel plate; at the same time, when the ultra-high strength steel plate is in a hot red state, the threaded section of the rod abuts against the ultra-high strength steel plate, rendering it easier for the ultra-high strength steel plate to form threads.

The beneficial effects of the present disclosure are as follows.

When applying pressure to the screw in the present disclosure, the top pressing rod penetrates the through hole of the threaded section of the rod and abuts against the end face of the tip portion, so that the direction of force on two sides remains consistent and they are not easily deformed. In addition, the applied force can be directly transmitted to the tip portion, thereby forming the recess fixing point for the ultra-high strength steel plate.

Other features and advantages of the present disclosure will be described in detail in the following section on specific embodiments.

DESCRIPTION OF EMBODIMENTS

Below, the technical solutions in the embodiments of the present disclosure will be clearly and completely described in combination with the accompanying drawings.

Figure 1:
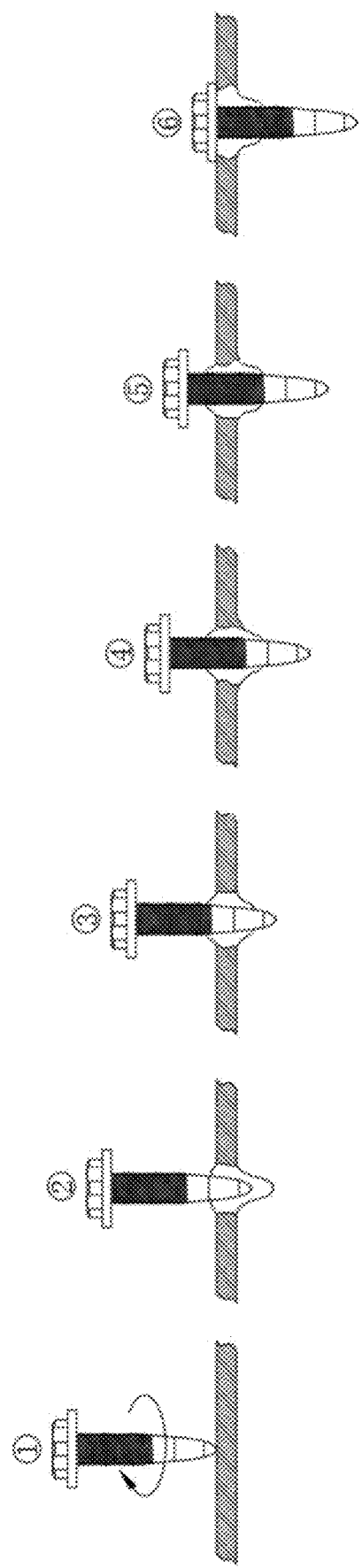
FIG. 1 is a schematic diagram of a usage process of the present disclosure.
Figure 2:
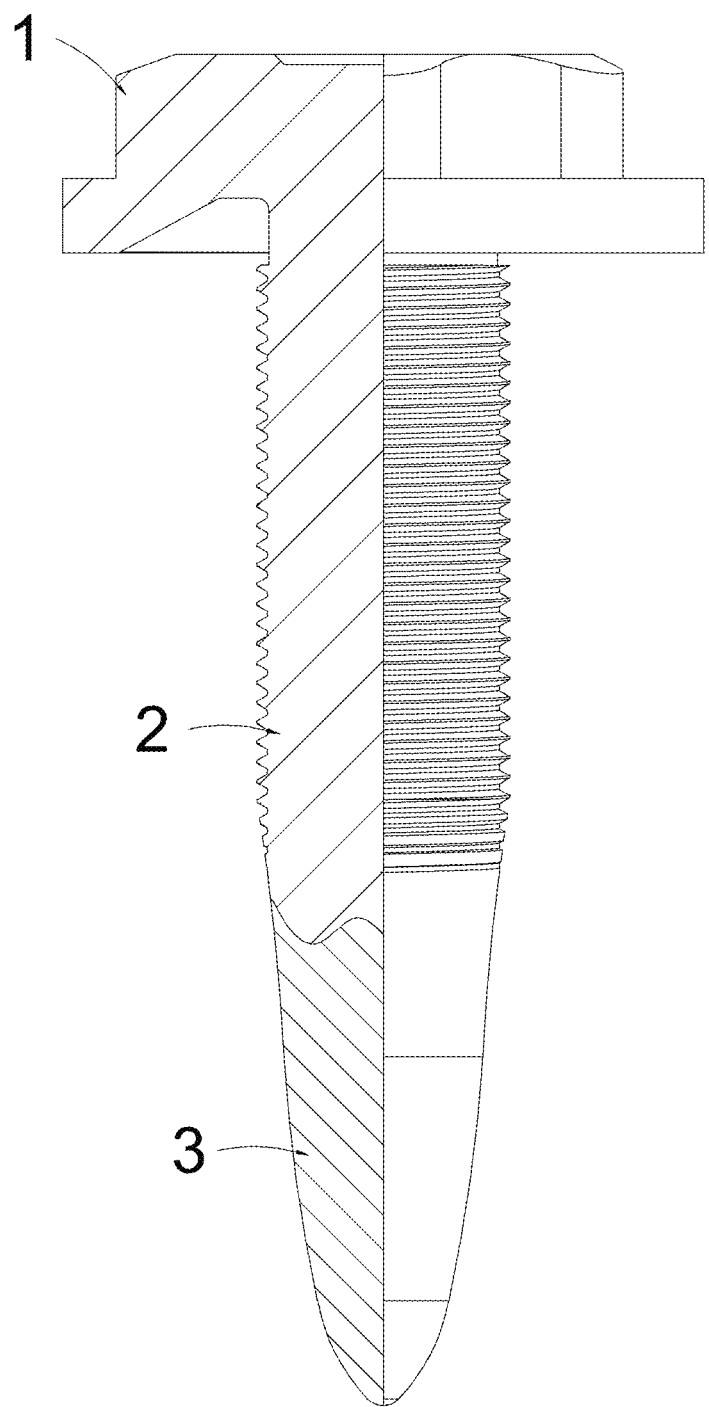
FIG. 2 is a first overall structural diagram of the present disclosure.
Figure 3:
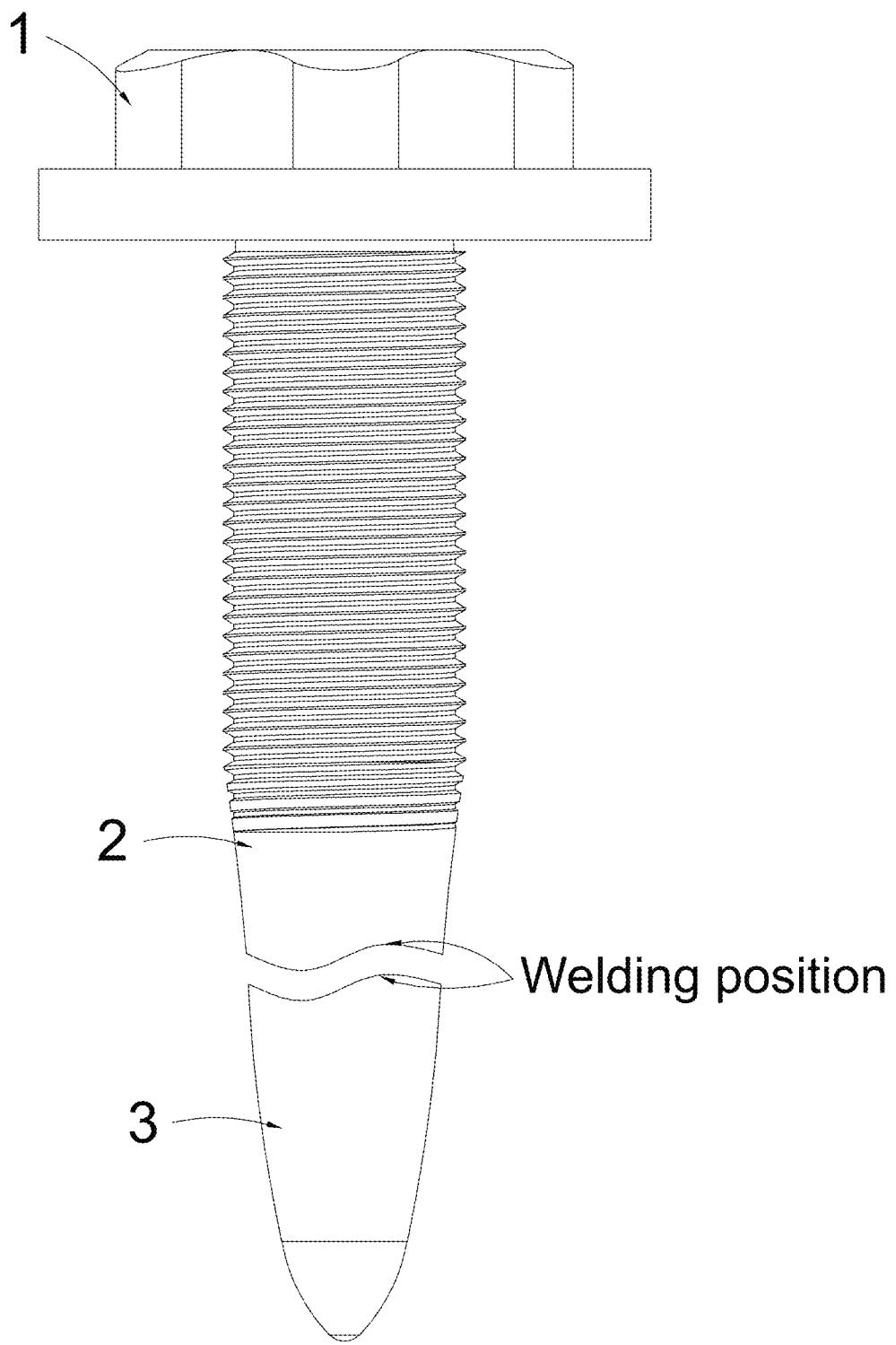
FIG. 3 is a schematic diagram of a threaded section and a tip portion of a rod of the present disclosure.
Figure 4:
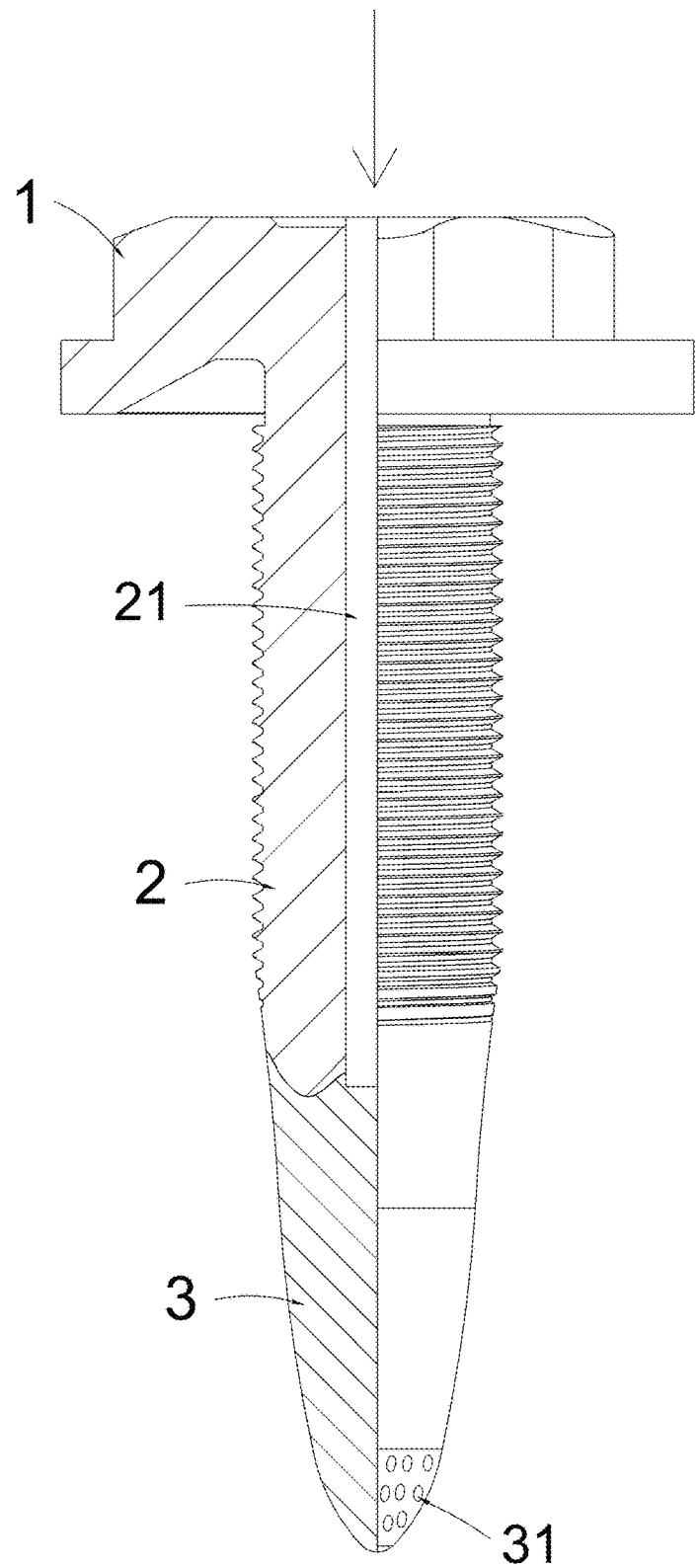
FIG. 4 is a second overall structural diagram of the present disclosure.

Please refer to FIGS. 1-4, a flow drill screw described in the present disclosure adopts a composite structure, aiming to adapt to different plates and usage environments, and can effectively save costs. In an implementation mode, it includes a head 1, a threaded section 2 of a rod, and a tip portion 3. The head 1 is configured to connect with an external tool, the threaded section 2 of the rod is configured for self-tapping a plate, and the tip portion 3 is configured to penetrate the plate. The threaded section 2 of the rod and the tip portion 3 are made of different metal materials and ends of the threaded section 2 of the rod and the tip portion 3 are connected and fixed by welding.

Assuming that the flow drill screw is applied to an ultra-high strength steel plate, the tool is connected to the head 1 during use, and output high speed and pressure are applied, the high-speed rotating tip portion 3 of the screw is caused to exert downward pressure on the workpiece surface. During this process, extremely high frictional heat is generated between the tip portion 3 and the ultra-high strength steel plate. The ultra-high strength steel plate can withstand extremely high temperatures, and ordinary flow drill screws are usually made of stainless steel or alloy. Before passing through the ultra-high strength steel plate, the tip portion 3 will be melted and deformed due to high temperature, and cannot continue. Therefore, it is associated with using higher strength metals to make flow drill screws, in an implementation mode, it is a tungsten steel material, with high hardness, 82.0-93.6HRA, equivalent to 69-81HRC, red hardness, reaching 900-1000° C. and maintaining 60HRC. It does not deform and has good wear resistance, but precisely because of these characteristics, it is very difficult to process threads and the cost is very high. Therefore, in this implementation mode, the tip portion 3 is made of tungsten steel material, and the threaded section 2 of the rod is made of stainless-steel material. The entire screw is welded together by using the characteristics of tungsten steel, which can pass through ultra-high strength steel plates without deformation at extremely high temperatures. At a perforation point, the ultra-high strength steel plate will produce extremely high temperatures and soften. At this time, the threaded section 2 of the rod can easily achieve self-tapping and connection fixation by entering the through hole 21.

A significant amount of frictional force requires to penetrate the ultra-high strength steel plate. An outer circumference of the traditional tip portion is relatively smooth, rendering it difficult to generate huge frictional force, resulting in a very long time required to pass through the ultra-high strength steel plate. To solve this problem, in this embodiment, a plurality of concave points 31 are provided on an outer circumference of a lower end of the tip portion to increase a frictional force between the tip portion and the ultra-high strength steel plate, so that it can generate high temperature faster and pass through the ultra-high strength steel plate in a shorter time.

Assuming it is applied in a relatively harsh environment with a certain degree of corrosiveness, the most important ones are the head 1 and the threaded section 2 of the rod, which need to be responsible for subsequent screw disassembly because these two parts need to have corrosion resistance. In an implementation mode, these two parts are integrally formed and made of corrosion-resistant steel material. In this embodiment, the tip portion 3 is not so important, mainly used to penetrate the plate. After the threaded section 2 of the rod is fixed to the plate, the task is completed. If it corrodes off after a period of use, it will not affect the fixing effect of the riveting. Therefore, in this embodiment, the tip portion 3 is made of ordinary stainless-steel material. Of course, the plate used in this embodiment is of ordinary thickness and material, coated with a corrosion-resistant layer on its surface. The tip portion 3 made of stainless-steel material can penetrate it. The cost of corrosion-resistant steel is higher than that of ordinary steel, and adopting a segmented structure can effectively save costs.

In the present disclosure, the threaded section 2 and the tip portion 3 of the rod are made of two different materials, which can cope with different plates and meet different usage scenarios, and saving costs. This design enables the screw to perform well under various complex conditions, thereby improving its applicability and reliability, and has significant economic and social benefits.

There are many welding methods in the present disclosure, friction welding and eddy current welding are commonly used. In this embodiment, an end of the tip portion 3 and an end of the threaded section 2 of the rod are both provided with concave convex structures that are cooperated with each other. Through the concave convex structure, the ends of these two parts can be aligned, and then the coil is energized to generate eddy currents at the connection between the two, thereby forming a large amount of thermal melting to achieve a fixed connection. After that, it can be polished.

Or the end of the tip portion 3 and the end of the threaded section 2 of the rod are both flat, and the tip portion 3 and the threaded section 2 of the rod are clamped by fixtures, aligned coaxially, and then the two ends are connected with each other. By starting the equipment, the two fixtures are rotated in the opposite direction, causing high-speed friction at a contact point between the tip portion 3 and the threaded section 2 of the rod, generating a large amount of heat. Finally, they are melted and fixed, and then polished.

The above two welding methods can fully fix the threaded section 2 and the tip portion 3 of the rod together, thereby avoiding the occurrence of fracture during high-speed rotation friction.

When in use, a large amount of pressure needs to be applied to the screw. Due to the use of two different metals to make the screw, its stress structure is destroyed, and its ability to withstand pressure is lower than that of the integrally formed screw. Therefore, applying a certain amount of pressure to it will cause it to bend and other situations. In order to solve this problem, in this embodiment of the present disclosure, a through hole 21 is provided at a central axis position of the threaded section of the rod. One end of the through hole 21 is extended to an end face of the tip portion, and the other end thereof is extended to the head to communicate with an outside world. The through hole 21 can be formed at the threaded section of the rod first, or it can be formed by turning the hole after the screw is formed.

In an implementation mode, the tip portion is made of tungsten steel, which is extremely difficult to process, and it is difficult to ensure alignment with the through hole 21 of the threaded section of the rod after processing. Therefore, only the through hole 21 is formed at the threaded section of the rod to compensate for its stress deficiency.

When in use, the head of the screw is clamped with a tool, and the other end of the screw abuts against the ultra-high strength steel plate, keeping it perpendicular to the ultra-high strength steel plate. At the same time, the tool is provided with a top pressing rod passing through the through hole 21, and an end of the top pressing rod abuts against an end face of the tip portion, and in a center position of the end face of the tip portion. The threaded section of the rod is under the same force as the tip portion, and the threaded section of the rod will not be bent relative to the tip portion.

The present disclosure further discloses a use method for fixing an ultra-high strength steel plate, including the above-mentioned flow drill screw, and the specific steps are as follows:

step 1, a tool is used to clamp the head of the screw, the other end of the screw abuts against the ultra-high strength steel plate and kept perpendicular to the ultra-high strength steel plate; at the same time, the tool is provided with a top pressing rod that penetrates the through hole 21, and the end of the top pressing rod abuts against the end face of the tip portion;

step 2, pressure is applied to the screw using the tool; end faces of the head and tip portion of the screw are simultaneously subjected to pressure, and the pressure is concentrated at a contact point between the tip portion and the ultra-high strength steel plate, thereby forming a recess fixing point on the ultra-high strength steel plate;

step 3, a tool is used to rotate the screw at high speed and continuously apply pressure to the ultra-high strength steel plate, thereby creating a huge frictional force between the ultra-high strength steel plate and the tip portion; the tip portion is made of tungsten steel alloy material, the tip portion can withstand temperatures up to 900-1000° C.; during this process, the ultra-high strength steel plate is in a hot red and soft state, allowing the tip to penetrate the ultra-high strength steel plate; at the same time, when the ultra-high strength steel plate is in a hot red state, the threaded section of the rod comes into contact with it, rendering it easier for the ultra-high strength steel plate to form threads.

Based on the above use method, when applying pressure to the screw, the top pressing rod penetrates the through hole of the threaded section of the rod and abuts against the end face of the tip portion, keeping the direction of force on two sides consistent and not easily deformed. In addition, the applied force can be directly transmitted to the tip portion, thereby forming a recess fixing point for the ultra-high strength steel plate.

For those skilled in the art, it is obvious that the present disclosure is not limited to the details of the exemplary embodiments described above, and can be implemented in other specific forms without departing from the spirit or essential features of the present disclosure. Therefore, from any point of view, embodiments should be regarded as exemplary and non-limiting, and the scope of the present disclosure is limited by the appended claims rather than the above description. Therefore, it is intended to encompass all variations falling within the meaning and scope of the equivalent elements of the claims within the scope of the present disclosure. Any reference numerals in the claims should not be regarded as limiting the claims involved.

Furthermore, it should be understood that although this specification is described according to the embodiments, not each embodiment only contains an independent technical solution. This description in the specification is only for clarity, and those skilled in the art should consider the specification as a whole. The technical solutions in each embodiment can also be appropriately combined to form other implementations that those skilled in the art can understand.

What is claimed is:

1. A flow drill screw, comprising a head, a threaded section of a rod, and a tip portion,
   wherein the head is configured to connect with an external tool;
   the threaded section of the rod is configured for self-tapping a plate, and a through hole is provided at a central axis position of the threaded section of the rod;
   one end of the through hole is extended to an end face of the tip portion, and the other end of the through hole is extended to the head to communicate with an outside world;
   the tip portion is configured to penetrate the plate, and the tip portion is made of tungsten steel alloy material;
   the threaded section of the rod and the tip portion are made of different metal materials and ends of the threaded section of the rod and the tip portion are connected and fixed by welding; and
   fixing the flow drill screw to a steel plate comprises:
   a tool is used to clamp the head of the screw, the other end of the screw abuts against the steel plate and kept perpendicular to the steel plate; at the same time, the tool is provided with a top pressing rod passing through the through hole, and an end of the top pressing rod abuts against an end face of the tip portion; the threaded section of the rod is under the same force as the tip portion, and the threaded section of the rod is not bend relative to the tip portion;
   pressure is applied to the screw with the tool; end faces of the head and the tip portion of the screw that are connected with the steel plate are simultaneously subjected to pressure, and the pressure is concentrated at a contact point between the tip portion and the steel plate, thereby forming a recess fixing point on the steel plate; and
   the tool is used to rotate the screw and continuously apply pressure to the steel plate, thereby creating a frictional force between the steel plate and the tip portion; the tip portion is made of tungsten steel alloy material, and the tip portion withstands temperatures up to 1000° C.; during this process, the steel plate is in a hot red and soft state, so that the tip portion penetrates the steel plate; at the same time, when the steel plate is in a hot red state, the threaded section of the rod abuts against the steel plate, rendering it easier for the steel plate to form threads.

2. The flow drill screw according to claim 1, wherein an end of the tip portion and an end of the threaded section of the rod are both provided with concave convex structures that cooperate with each other.

3. The flow drill screw according to claim 1, wherein the end of the tip portion and the end of the threaded section of the rod are both flat.

4. The flow drill screw according to claim 1, wherein the threaded section of the rod is made of corrosion-resistant steel material.

5. The flow drill screw according to claim 1, wherein a lower end of the tip portion is provided with a plurality of concave points on an outer periphery.

\* \* \* \* \*